July 17, 1928.

S. O. HALE 1,677,338

COMBINED CLUTCH AND BRAKE MECHANISM FOR HOISTING DRUMS

Filed May 23, 1925

INVENTOR.
SAMUEL O. HALE
BY
Edward A. Strauss
ATTORNEY.

Patented July 17, 1928.

1,677,338

UNITED STATES PATENT OFFICE.

SAMUEL OTIS HALE, OF WHITTIER, CALIFORNIA.

COMBINED CLUTCH AND BRAKE MECHANISM FOR HOISTING DRUMS.

Application filed May 23, 1925. Serial No. 32,340.

This invention relates more specifically to a combined clutch and brake mechanism for drums.

A main object is to provide a combined clutching and braking mechanism for hoisting drums in which both mechanisms are controlled and operated by a single lever mechanism independently of each other.

A further object is to provide a clutch construction for hoisting drums and the like, in which the clutch mechanism may be "slipped," to prevent a breakage of the hoisting line should the object being elevated become caught.

A still further object is to provide a mechanism in which all strains occasioned by an operation of the clutching element on the shifting mechanism are effectively provided for.

This disclosure is to be regarded as descriptive only and not as restrictive or limitive of the invention, of which obviously an embodiment may be constructed including many minor modifications without departing from the general scope herein indicated, and hereinafter claimed.

Broadly the invention consists of a shaft rotatably mounted in suitable bearings, having a hoisting drum of approved design keyed or otherwise secured thereto, a clutching element loosely and reciprocatingly mounted on the shaft for actuating a plurality of segmental clutching shoes to engage and rotate the hoisting drum, suitable mechanism being provided and controlled by an operating lever to shift the clutching element into engagement with the hoisting drum. Provision is also made for checking the speed of the hoisting drum by means of a brake band which engages the clutching element, and is operated by the same operating lever that controls the shifting element of the clutch.

Other objects of this invention, not at this time more particularly enumerated, will be clearly understood from the following detailed description of the present invention.

Figure 1:
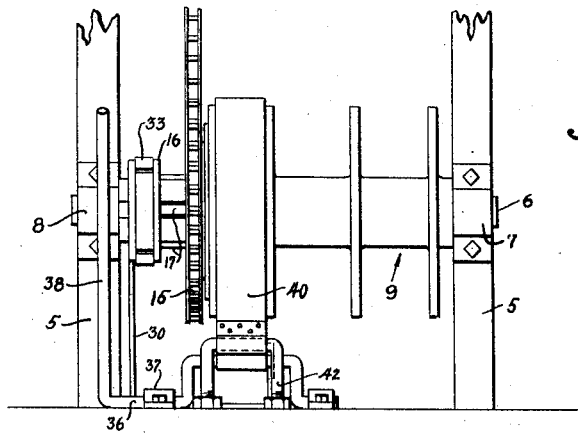
Fig. 1 is a front elevation of a "sand reel" used in oil well drilling operations, with my combined clutch and brake mechanism applied thereto.
Figure 6:
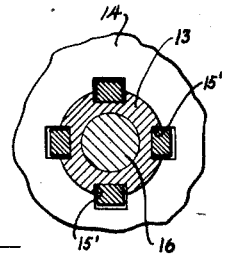
Fig. 6 is a cross section on line 6—6, Fig. 2.
Figure 2:
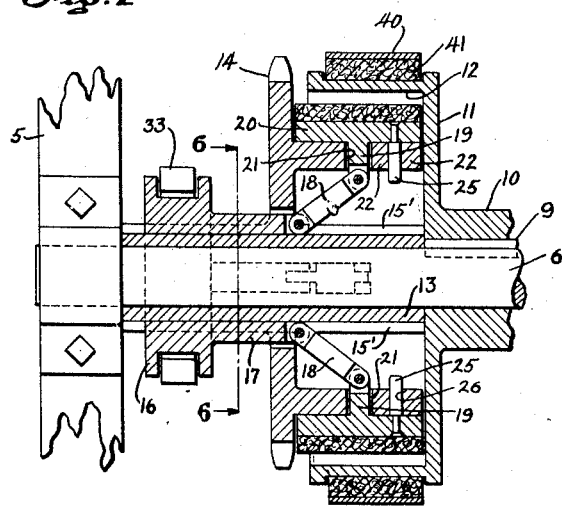
Fig. 2 is an enlarged detail longitudinal section through the clutching mechanism.

This invention is illustrated in connection with a "sand reel" construction of usual form generally employed in connection with the drilling of oil wells, but it will be understood that the mechanism may be just as effectively employed in connection with other hoisting drums such as "draw works" with equally satisfactory results.

In the drawings, 5 indicates vertically disposed timbers, between which a shaft 6, is mounted in bearings 7, 8, secured thereto. Rigidly secured to shaft 6, by a key 9 is a sand reel drum 10, having at one end a circular flange 11, provided on its outer face adjacent its circular edge with right angled circular brake flanges 12, formed integral therewith. Loosely mounted on shaft 6, and extending from flange 10 to bearing 8, is a sleeve 13, carrying a driving sprocket wheel 14, connected by a chain 15, to a suitable source of power (not shown). Sleeve 13 is provided in its peripheral surface with a plurality of longitudinally extending keyways 15', here shown as four in number. Disposed on sleeve 13, is a clutch shifting collar 16, provided on one of its faces with a plurality of outwardly projecting arms forming keys 17. that engage the keyways 15' formed in the sleeve. Pivoted to the ends of each of these arms are toggle links 18, their free ends being pivotally secured to lugs 19, formed on the inner surfaces of a plurality of segmental clutch shoes 20, the lugs passing through openings 21, formed in the wall of a circular flange 22, formed integral with the sprocket wheel 14, and projecting towards the flange 11 of the reel drum.

The clutch shoes 20, here illustrated as four in number, normally rest upon the peripheral surface of the circular flange 22 of the sprocket wheel, and their outer clutching surfaces are lined with a friction material 23, secured thereto in a suitable manner. Each clutch shoe is provided with a lug 24 secured to its inner face that engages with a registering opening 25, formed in the flange 22 of the sprocket wheel for the purpose of relieving the strain on the toggle links 18, when the clutch shoes are forced into clutching engagement with flanges 12 of the reel member.

The clutch operating mechanism preferably consists of a vertically disposed standard 30, having a laterally extending arm 31 at its lower end pivoted as at 32, to the base or floor upon which the reel mechanism is mounted. The upper end of this standard carries a yoke 33, that engages the flanged shifting collar 16 for shifting the same along the sleeve 13, when it is desired to operate the clutch shoes. Arm 31, has an upturned end 34, to the upper end of which is pivotally secured a lever 35, its free end being rigidly secured to a crank shaft 36, mounted in a bearing 37. Secured to the free end of the crank shaft is an operating handle 38, of an approved design.

The braking mechanism consists of a flexible metal back 40, provided with the usual brake lining 41, which passes around the brake flange 12, of the reel drum, one end being secured to the crank shaft 36, while its other end is secured to a standard 42, bolted or otherwise secured to the floor or reel support.

Figure 4:
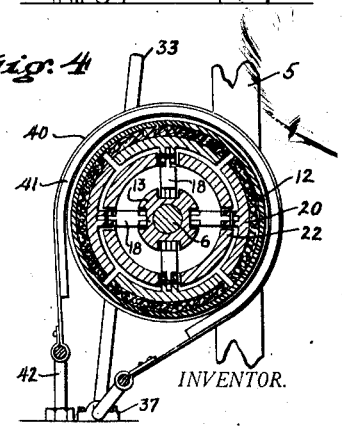
Fig. 4 is a similar view with the braking and clutching elements in a reverse position.

In the operation of the mechanism, the hoisting line (not shown) is attached to the reel in the usual manner, and when the operator desires to elevate or lower an object, he forces the operating lever 38, forwardly, as shown in Fig. 4 of the drawings, to rock the standard 30, to shift the collar 16 along the sleeve 13. This movement of the collar 16 operates the toggle links 18 to expand the segmental clutch shoes 20, into a frictional engagement with the interior surface of flange 12 to drive the reel.

As the clutch shoes are moved radially with respect to the flange 12, it will be clearly apparent that the same may be "slipped" by the pressure exerted on the operating lever, thus if the object being hoisted should accidentally meet with resistance, the breakage of the hoisting cable or line would be obviated. It will also be noted that by employing a clutch in connection with a "sand reel", that in elevating or hoisting objects, the initial or starting movement of the reel will exert an even gradual pull on the object being hoisted.

Figure 3:
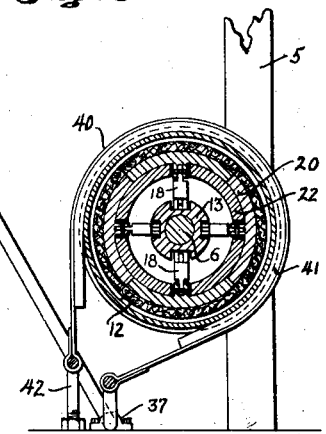
Fig. 3 is a cross sectional view through the brake drum and clutching mechanism showing the brake engaging the drum, and the clutch element out of engagement with the reel.
Figure 5:
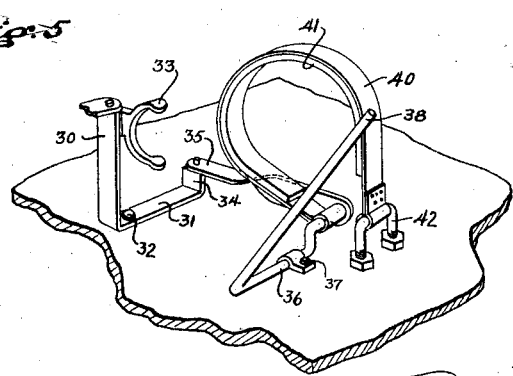
Fig. 5 is a transverse section taken on line 5—5 of Fig. 2.

The brake mechanism is operated by forcing the operating lever 38 rearwardly, or in a reverse direction to the movement of the same when operating the clutch mechanism, this position being clearly shown in Fig. 3. The brake is generally only operated in a lowering movement to check or control the movement of the object being lowered, but it is oftentimes employed in a hoisting operation to hold an object after the clutch shoes have been disengaged from the drum.

From the above description it will be observed that I have provided an efficient combination clutching and braking mechanism for hoisting drums that may be alternately controlled by a single operating lever, and by providing radially disposed clutching elements it will be possible to "slip" the same to save a parting of the hoisting line in case the object being hoisted meets with resistance.

What I claim is:

1. A mechanism of the class described comprising a shaft mounted for rotation, a reel rigidly secured to said shaft for rotation therewith, said reel provided on one side with a brake drum, a sleeve having a plurality of keyways loosely mounted on said shaft, a driving gear secured to said sleeve having a circular flange projecting from one of its faces, a shifting collar provided with keys engaging the keyways on said sleeve, a plurality of segmental clutch shoes arranged on the periphery of the gear flange, toggle links connecting the shoes and the circular shifting collar for forcing the shoes into frictional engagement with the internal periphery of the brake drum, whereby to rotate the drum, a brake band engaging the brake drum, means engaging the shifting collar to actuate the brake shoes, and a single lever mechanism for operating the clutch and brake mechanisms alternately.

2. A hoisting drum construction comprising a shaft mounted for rotation, a hoisting drum mounted on said shaft to rotate therewith, said drum being provided with a brake flange, a sleeve loosely mounted on said drum shaft having a driving means connected therewith, a plurality of radially movable clutch shoes disposed on said driving means, said shoes adapted to engage the inner periphery of the brake flange, a shifting collar keyed to said sleeve, toggle links connecting the shifting collar with the clutch shoes, a crank arm mounted in bearings, a brake band engaging said brake flange of the hoisting drum, one end of said band being pivotally secured to the drum support and its other end secured to the crank arm, a yoke engaging the clutch shifting collar, a linkage connecting the yoke with the crank arm, and a lever for rotating the crank arm to operate the clutch and brake band alternately.

In witness that I claim the foregoing I have hereunto subscribed my name this 9th day of April, 1925.

S. O. HALE.